United States Patent
Warner et al.

(10) Patent No.: US 7,566,428 B2
(45) Date of Patent: Jul. 28, 2009

(54) BED SUPPORT MEDIA

(75) Inventors: Dean Warner, Kent, OH (US); Hassan S. Niknafs, Stow, OH (US); Daniel C. Sherman, Hudson, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 496 days.

(21) Appl. No.: 11/124,969

(22) Filed: May 9, 2005

(65) Prior Publication Data

US 2006/0251555 A1  Nov. 9, 2006

Related U.S. Application Data (63) Continuation-in-part of application No. 11/078,776, filed on Mar. 11, 2005, now abandoned.

(51) Int. Cl.
*B01J 8/02* (2006.01)
(52) U.S. Cl. .................. 422/211; 422/221; 422/310; 422/311; 261/94
(58) Field of Classification Search .......... 422/211, 422/221, 310, 311; 261/94
See application file for complete search history.

(56) References Cited

U.S. PATENT DOCUMENTS

| | | | | |
|---|---|---|---|---|
| 2,055,162 A | * | 9/1936 | Weber | .......... 261/94 |
| 3,560,167 A | | 2/1971 | Bruckner | |
| 3,652,451 A | | 3/1972 | Boyd | |
| 3,902,856 A | | 9/1975 | Burroughs et al. | |
| 4,002,705 A | * | 1/1977 | McKeown | .......... 261/98 |
| 4,005,985 A | * | 2/1977 | Hutson, Jr. | .......... 422/217 |
| 4,155,960 A | | 5/1979 | Gerdes et al. | |
| 4,285,910 A | | 8/1981 | Kennedy | |
| 4,511,519 A | | 4/1985 | Hsia | |
| 4,615,796 A | * | 10/1986 | Kramer | .......... 208/146 |
| 4,904,456 A | * | 2/1990 | Anderson | .......... 422/220 |
| 5,242,626 A | * | 9/1993 | Oshima | .......... 261/94 |
| 5,314,645 A | | 5/1994 | Rukovena | |

(Continued)

FOREIGN PATENT DOCUMENTS

WO  WO 2005/072862  *  8/2005

OTHER PUBLICATIONS

Sabri Ergun and A.A. Orning, "Fluid Flow through Randomly Packed Columns and Fluidized Beds", *Industrial and Engineering Chemistry*, vol. 41, No. 6, p. 1, 181 (Jan. 1949).

(Continued)

*Primary Examiner*—N. Bhat
(74) *Attorney, Agent, or Firm*—Fay Sharpe LLP; Ann M. Skerry; Stewart A. Fraser (57) ABSTRACT

A system for treatment of one or more flowing materials includes a support bed (32) comprising a plurality of support elements (34). The support bed may have a void fraction of at least 45%. An active bed (36), such as a bed of catalytic elements, may be supported by the support bed. The void fraction of the support bed may be larger than that of an equivalent bed of conventional, spherical elements, enabling significant improvements in the flow rate of reactants through the bed and/or a reduced pressure drop across the support bed.

21 Claims, 6 Drawing Sheets

U.S. PATENT DOCUMENTS

| | | | |
|---|---|---|---|
| 5,338,518 A * | 8/1994 | Marion et al. | 422/211 |
| D354,687 S | 1/1995 | Niknafs | |
| 5,512,530 A | 4/1996 | Gerdes et al. | |
| D381,394 S | 7/1997 | Lex, Jr. et al. | |
| 5,733,840 A | 3/1998 | Szymanski et al. | |
| 5,733,842 A | 3/1998 | Gerdes et al. | |
| 5,747,143 A * | 5/1998 | Niknafs | 428/174 |
| 5,914,432 A | 6/1999 | Lume-Pereira | |
| 5,952,529 A | 9/1999 | Chang et al. | |
| 6,007,915 A | 12/1999 | Rukovena | |
| D445,029 S | 7/2001 | Niknafs | |
| 6,291,603 B1 * | 9/2001 | Glover | 526/71 |
| 6,365,259 B1 | 4/2002 | Brundage et al. | |
| 6,425,574 B1 * | 7/2002 | Sunder | 261/94 |
| 6,547,222 B2 * | 4/2003 | Blischak et al. | 261/94 |
| 6,605,557 B2 | 8/2003 | Reid et al. | |
| 6,649,662 B2 | 11/2003 | Kibby | |
| 6,656,874 B2 | 12/2003 | Lockemeyer | |
| 6,666,436 B1 * | 12/2003 | Lerner | 261/95 |
| 6,699,562 B2 | 3/2004 | Niknafs et al. | |
| 6,703,337 B2 | 3/2004 | Reid et al. | |
| 6,703,530 B2 | 3/2004 | Kissinger et al. | |
| 6,891,061 B1 * | 5/2005 | Nishimura et al. | 560/218 |
| 2002/0068026 A1 * | 6/2002 | Murrell et al. | 422/211 |
| 2003/0160342 A1 | 8/2003 | Niknafs et al. | |
| 2003/0161992 A1 | 8/2003 | Niknafs et al. | |
| 2003/0232172 A1 | 12/2003 | Niknafs et al. | |
| 2004/0170556 A1 | 9/2004 | Szymanski et al. | |

OTHER PUBLICATIONS

Max Leva and Hilton Grummer, "Pressure Drop Through Packed Tubes—Part 2. Effects of Surface", *Chemical Engineering Progress*, vol. 43, No. 11, p. 637 (Nov. 1947).

Kenji Fukuda, Tetsuya Kondoh and Shu Hasegawa, "Relationship Between Heat Transfer and Pressure Drop of Porous Materials", *Engineering Science Report*, vol. 14, No. 2, pp. 213-223, (Sep. 1992).

International Search Report for PCT/US2006/008497 which claims priority of U.S. Appl. No. 11/124,969 (identified above).

Writen Opinion based on international search report for PCT/US2006/008497.

International Preliminary Report on Patentability for PCT/US2006/008497.

* cited by examiner

BED SUPPORT MEDIA

This application is a continuation-in-part of U.S. application Ser. No. 11/078,776, filed Mar. 11, 2005, now abandoned, the disclosure of which is incorporated herein by reference in its entirety.

BACKGROUND

1. Field of the Invention

The present exemplary embodiment relates to bed support media. It finds particular application in conjunction with support media for a catalyst bed, and will be described with particular reference thereto. However, it is to be appreciated that the present exemplary embodiment is also amenable to other like applications.

2. Discussion of the Art

In some catalytic reactors, a catalyst bed is formed of a carrier material, typically comprising particulate elements, which supports a catalytic material, such as a metal or metal oxide. Carriers, or catalyst supports, as they are often known, are commonly inorganic materials such as refractory inorganic materials, for example alumina-, silica-, or titania-based compounds, or combinations of these, such as alumina-silica carriers. Carriers may also be formed from carbon-based materials such as, for example, charcoal, activated carbon, or fullerenes. The carrier may have a porous or open structure, such as a ring, honeycomb, or wagon wheel, which provides a large geometric surface area on which the catalyst is supported.

Where the catalyst bed is relatively shallow, the bed may be supported on a foraminous plate, crossed beams, or a similar structure. For beds of greater depth, and consequently greater weight, the catalyst bed is supported in a tower, on a second bed, or support bed, which is typically formed of individual ceramic spheres. Spheres are used to have sufficient strength to support the weight of the catalyst bed and, in the case of the lowermost spheres, the entire weight of the support bed. The spheres are generally of larger diameter than the elements of the catalyst bed that they support. The spherical elements in a support bed have a void fraction, measured as a percentage, of up to about 36%, due to the spaces between the elements. These spaces or voids allow the reactant material to pass through the support bed either before or after coming into contact with the catalyst bed above, depending on the direction of flow. Pellets have also been used as support elements, which, due to their shape, may have slightly higher void fraction than spheres.

SUMMARY

In accordance with one aspect of the present exemplary embodiment, a system for treatment of one or more flowing materials is provided. The system includes a shell and a support bed in the shell comprising a-plurality of support elements. The support bed has a void fraction of at least 50%. An active bed in the shell is supported by the support bed. The support bed has an activity towards the one or more flowing materials which is less than 20% of that of the active bed on a basis of weight.

In accordance with another aspect of the present exemplary embodiment, a system for treatment of one or more flowing materials is provided. The system includes a support bed comprising a plurality of non-spherical support elements. The support elements each define at least one through passage. A bed comprising a plurality of active elements is supported by the support bed. The support elements have an activity per unit weight towards the flowing materials which is no greater than 20% of the activity per unit weight of a majority of the active elements in the bed of active elements.

In accordance with another aspect of the present exemplary embodiment, a system for treatment of a fluid material is provided. The system includes a shell having a base at a lower end thereof and an inlet and an outlet for the fluid material. A column of elements is within the shell through which the fluid material passes. The column includes a support bed of elements. The support bed includes the elements of the column that are closest to the base. The support bed has a void fraction of at least 50%. An active bed of elements is supported by the support bed for treatment of the fluid material.

In accordance with another aspect of the present exemplary embodiment, a system for treatment of a fluid material is provided. The system includes a shell having a base at a lower end thereof and an inlet and outlet. One of the inlet and the outlet is closer to the base than the other of the inlet and outlet. A column of elements is within the shell through which the fluid material passes between the inlet and the outlet. The column includes an active bed of active elements for treatment of the fluid material and a support bed which supports the active bed thereon. The support bed includes a plurality of elements each having at least one through passage. The support bed includes those elements of the column that are closest to the one of the inlet and outlet that is closer to the base. The support bed has a void fraction of at least 45%.

In accordance with another aspect of the present exemplary embodiment, a method of forming a system for treatment of a flowing material is provided. The method includes placing a plurality of support elements in a column to form a support bed. The support bed has a void fraction of at least 50%. A layer of the support bed is formed which defines a lowermost layer of elements in the column. A bed of active elements is supported on the support bed.

DETAILED DESCRIPTION

An important factor in maximizing efficiency of the catalyst bed is the maintenance of an adequate flow rate of the reactant materials through the bed. While shallow catalyst beds may experience a high flow rate with an acceptable pressure drop across the bed, maintaining this flow rate as the depths of the catalyst bed and of the support bed increase results in increasing pressure drop across the bed. It is desirable to achieve as low a pressure difference between the top and bottom of the bed as possible. In the past, this has been achieved by designing the carrier elements in the catalyst bed such that they present reduced resistance to flow. However, there are limits to the pressure drop reductions that may be obtained in this way while maintaining a desired catalytic activity.

Figure 1:
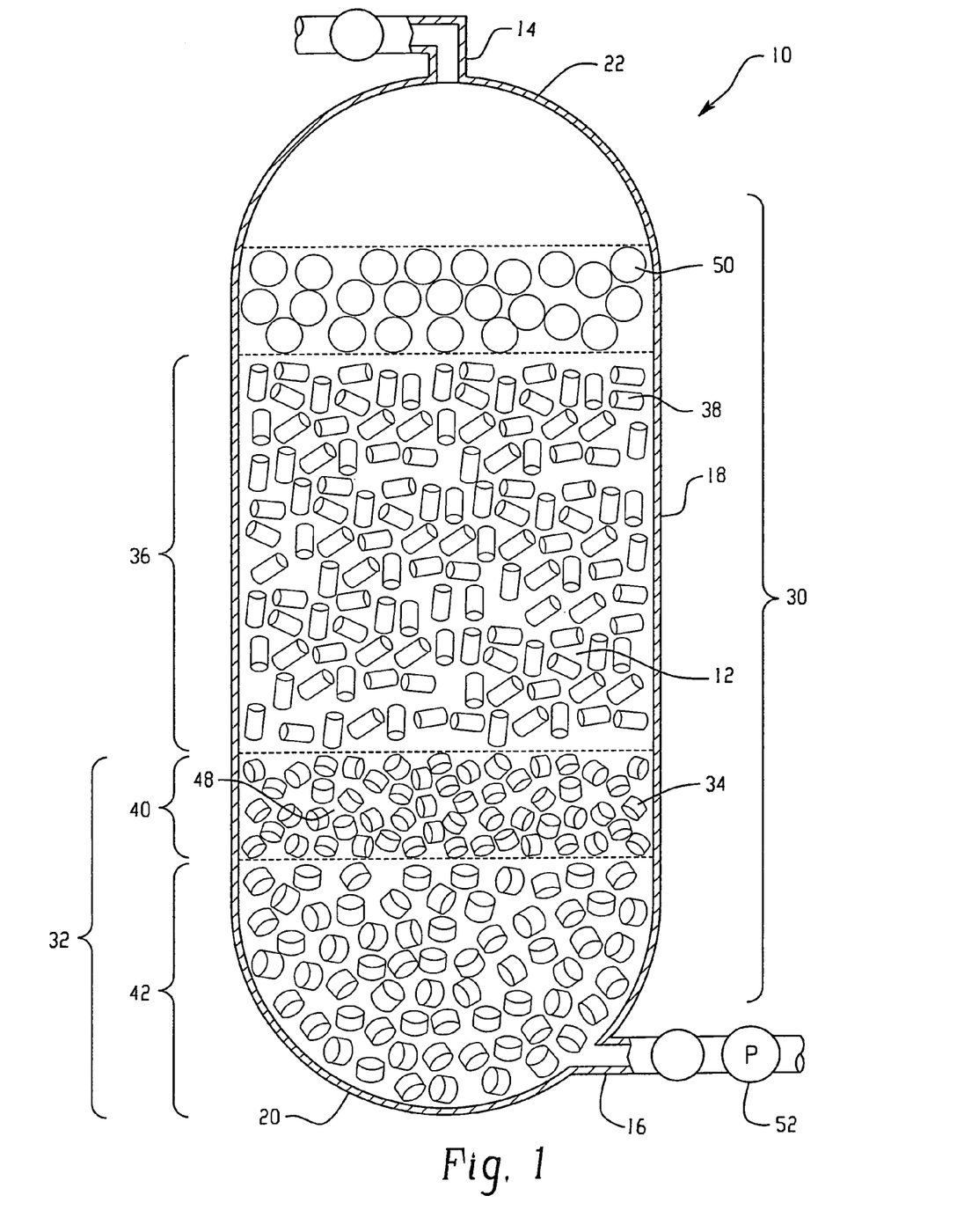
FIG. 1 is a side sectional view of a treatment system according to the present invention.

With reference to FIG. 1, a system for treatment of one or more flowing materials is shown. The system may be any type of treatment system, such as a sequestering system or a catalytic treatment system. The system is generally illustrated herein as a catalytic treatment system by way of example. In a catalytic treatment system, the flowing materials may include reactant materials.

The system may include a shell or tower 10 that defines an interior chamber 12 and an inlet 14 and an outlet 16, through which one or more fluid reactant materials, such as a gases and/or liquids, enter and leave the chamber. The outlet 16 may be formed in a side wall 18 adjacent to a base 20 of the tower or formed within the base itself and the inlet is formed in or adjacent an upper wall 22 of the tower. In the illustrated embodiment, the reactant material flows downward through the tower. It will be appreciated, however, that the locations of the inlet 14 and outlet 16 may be reversed and the reactants may flow upward through the tower.

A column of discrete elements 30 within the chamber includes a support bed 32, which is disposed adjacent the base 20 of the chamber 12. The support bed includes a plurality of discrete support elements 34 that are located within the shell. The support bed provides support for an active bed 36, such as a catalyst bed or sequestering bed, the weight of which is carried thereon. The support elements may be placed in the shell by dumping them into in the shell to provide a substantially random arrangement of surfaces. Catalyst bed 36 is supported on the support bed 32 and comprises a plurality of discrete catalytic elements 38 that are located within the shell. The catalytic elements may also be placed by dumping to provide a random arrangement of surfaces that provide tortuous paths for the flow of the reactant material, or arranged in a more ordered fashion. The catalytic elements 38 may comprise a carrier that supports a catalytic material, such as a metal or metal oxide, capable of catalyzing a reaction of one or more components of the reactant materials, or be otherwise formed to have catalytic activity.

In one embodiment, the support elements 34 are arranged in a plurality of layers 40, 42. The support bed typically includes the lowermost layer of elements of the column 30. In the illustrated embodiment, this is layer 42, which is supported only by the gravitational base 20 of the reactor and not by any other discrete elements. Two layers 40, 42 are illustrated in FIG. 1, by way of example, although fewer or more layers may be used, such as one, three, or four layers. In one embodiment, only two layers 40,42 are used. The average size of the elements in one layer (for example, expressed in terms of the mean diameter, where the diameter of an element is determined, for example, as the average width of the element or the maximum width) differs from that of the adjacent layer. In one embodiment, the average size of the support elements 34 in uppermost layer 40, closest to the catalyst bed 36, is less than that of the next layer 42, which, in turn, is less than that of any subsequent layer, and so on to the lowest layer (layer 42 in the illustrated embodiment). The sizes may be chosen so as to hold the catalyst in place without appreciable percolation of the catalytic elements through the support bed. For example, the lowermost layer 42 may comprise elements having an average size of about 10 mm, and layer 40, elements of an average size of about 6 mm. It will be appreciated that the actual sizes may depend, to some degree, on the size of the catalyst elements. Typically, the average diameter of the support elements in the uppermost layer is at least about 1-2 mm greater than the average diameter of the adjacent catalyst elements. For example, the catalyst elements may be pellets of about 3 mm in diameter with a ratio of diameter to length of about 1:2 to 1:3 and the support elements in first layer 40 may have a diameter of about 6 mm. Two or more additional layers of elements may be added below the two layers illustrated, for example, layers with average sizes of about 24-50 mm and 19 mm, respectively.

The support elements 34 may be non-spherical. In some embodiments, the support elements may be formed to permit passage of reactants through the elements, rather than simply around the elements, as in a conventional support bed of pellets or spheres. While a conventional support bed typically has four or more layers of increasing size towards the bottom of a reactor, it has been found that for the non-spherical support elements 34 disclosed herein, fewer layers may be needed than for spherical or pelletized elements. As a result, the depth of the bed can be less than for a conventional bed. For example, a support bed comprising two layers, or even one layer, can replace a conventional four layer bed of spherical or pelletized elements.

Having the smallest support elements 34 positioned closest to the catalyst bed provides void spaces 48, between the support elements 34, which are generally too narrow for the catalytic elements 38 to pass therethrough to any great degree. In general, this means that the uppermost layer 40 comprises support elements 34 of a larger average size than the catalytic elements 38 of the adjacent catalyst bed 24. Having increasingly larger support elements 34 towards the lower end of the support bed 32 allows for an increased void fraction and large passages through the bed, which reduces the pressure drop across the bed for a given flow rate while maintaining the strength needed to support the entire catalyst bed and support bed load. The large support elements support the smaller support elements. The larger support elements may be sufficiently large that they do not pass through the inlet or outlet at the bottom end of the reactor and yet small enough to prevent the layer of support elements immediately above them from percolating through. The larger support media may also offer a lower pressure drop for a given flow rate. In the illustrated embodiment, the lower layer 42 is in contact with the base 20 of the reactor.

As shown in FIG. 1, each layer of the column typically lies directly on the underlying layer, without any spacers or the like between the layers. However, it is also contemplated that spacers may be interposed between the layers and/or at the top and bottom of the column.

Optionally a bed limiter 50 is positioned on top of the catalyst bed. The bed limiter helps to reduce the loss of catalyst elements in the upward flow of the reactant in an upward flow reactor and reduces catalyst movement in downflow reactors. A pressure drop across the height of the column 30 includes contributions from the support bed 32, catalyst bed 36, bed limiter 50, where present, and any other layers which may be used. Generally, the catalyst bed accounts for the largest portion of the pressure drop. In one embodiment, the catalyst bed pressure drop is at least four times that of the support bed pressure drop at a typical operating flow rate. By changing from spherical elements to non-spherical elements 34 the pressure drop across the support bed for a particular flow rate can be reduced by about 10% or more in one embodiment, 20% or more in another embodiment, and 50% or more in yet another embodiment. For example, the pressure drop across the support bed may drop from about 20 cm water/m of bed to about 4 cm water/m of bed or less, at a given gas mass velocity, when spherical elements are replaced with non-spherical elements with higher void fraction. This difference can be used to increase the rate of flow through of reactants and/or the depth of the catalyst bed while maintaining a consistent pressure drop. This may result in a higher conversion rate for each pass through the reactor.

In a typical catalytic process in a downflow reactor, one or more reactant materials (e.g., liquid, gas, or vapor) enter the inlet of the chamber and pass downward through the bed delimiter, where present, then the catalyst bed and support bed. In the case of liquid reactant materials, the movement may be unassisted. In some cases, counter-current liquid/gas flow may occur, although generally to a lesser degree. A pump 52, in fluid communication with the inlet or outlet, is optionally used for gaseous or vapor phase reactant materials, or to increase the flow rate of a liquid material. When the reactants enter the catalyst bed, the catalyst associated with the catalytic elements catalyzes one or more reactions of a component or components of the reactant materials. The reaction products, and any residual reactant materials, pass out of the catalyst bed and through the support bed before exiting the reactor via the outlet. It will be appreciated that in an upflow reactor, the direction of flow is reversed, i.e., the reactants material first pass through the support bed and then the catalyst bed before passing through any bed delimiter.

In certain treatment systems, such as sequestering systems, the active elements 38 may transfer mass between the flowing materials and elements of the active bed 36. It should be appreciated that as used herein, the term "active elements" refers to an element that actively participates in the treatment system, such as by catalyzing a reaction, reacting, or absorbing, adsorbing or desorbing one or more materials. Examples of catalytic processes include hydrotreating, hydrocracking, reforming, isomerization, and oxidation. Examples of sequestering processes include use of the active elements as absorbers or molecular sieves, for drying, separations, and extractions. While the active elements may also serve to distribute flow and/or improve the interfacial area for gas/liquid interactions, the term active elements does not include traditional mass transfer elements whose sole purpose is to distribute flow and/or improve the interfacial area for gas/liquid interactions.

The support elements 34 are non-spherical. This allows for a larger void fraction of the support bed than can be achieved with spherical support elements and a reduction in the pressure drop across the support bed at a given flow rate. Void fraction, as used herein, is the percentage of the entire volume of the support bed which is not occupied by the support elements, excluding any closed voids and small pores through which the reactant material does not pass at any appreciable rate (i.e., pores with a diameter of less than about 0.3 mm). For example, a bed of spherical, substantially non-porous elements may have a void fraction of no more than about 36%. It should be appreciated that higher and lower void fractions are theoretically possible if the support elements are carefully arranged, but that the values stated herein represent accepted empirical data and the conditions in actual beds, not theoretical values. Another way in which the void fraction/pressure drop reduction can be increased is to provide the support elements 34 with one or more through passages. Conventional pellets that have been used as support elements lack through passages and have a void fraction of no more than 47%. In one embodiment, the void fraction of the entire support bed 32 is at least 45%, in another embodiment, at least 50%, and in one specific embodiment, about 56%. The void fraction of the bed can be up to about 80%, depending on the weight of the bed that is supported thereon. In one embodiment, the void fraction is up to about 75% and in another it is less than about 65%.

It will be appreciated that the individual layers 40, 42 of the support bed may have different void fractions from that of the overall bed 32, the void fractions generally being greater as the mean size of the support elements comprising the layer increases. The void fraction of the entire bed 32 is an overall void fraction that takes into account the void fractions of the various layers.

Even small increases in void fraction can have a significant effect on the efficiency of the bed 32 and of the entire column 30. For example, a pressure drop across a support bed formed of spherical support elements may be about 140 g/cm$^2$ at a given flow rate. The bed 32 of non-spherical elements may have a pressure drop at this flow rate which is less than about 80% of that of a bed of an equivalent height of spherical substantially non-porous elements having the same average element size (112 g/cm$^2$ in the illustrated embodiment). In one embodiment, the pressure drop of the bed 32 is less than 60% of the equivalent spherical element bed, and in another embodiment, the pressure drop is about 50% or less of that of the equivalent bed. In one specific embodiment, the pressure drop is about 20% that of the equivalent bed. The equivalent spherical diameter is determined by calculating the radius of a sphere having an equivalent volume. In this determination, the outer dimensions of the non-spherical support element are measured to determine the volume. The measured volume thus includes the void spaces created by the through passages within the element.

The term "non-spherical", and similar terms are used herein to mean an average ratio of minimum dimension to maximum dimension of about 0.70 or less, in one embodiment about 0.6 or less, and in another embodiment, of about 0.5, or less, or having an average sphericity value of less than about 0.70, or 0.6, or 0.5, compared to a Krumbein and Sloss chart. Conventional balls used for support elements, even if not precisely spherical, have an average sphericity value of close to 1.0.

Figure 2:
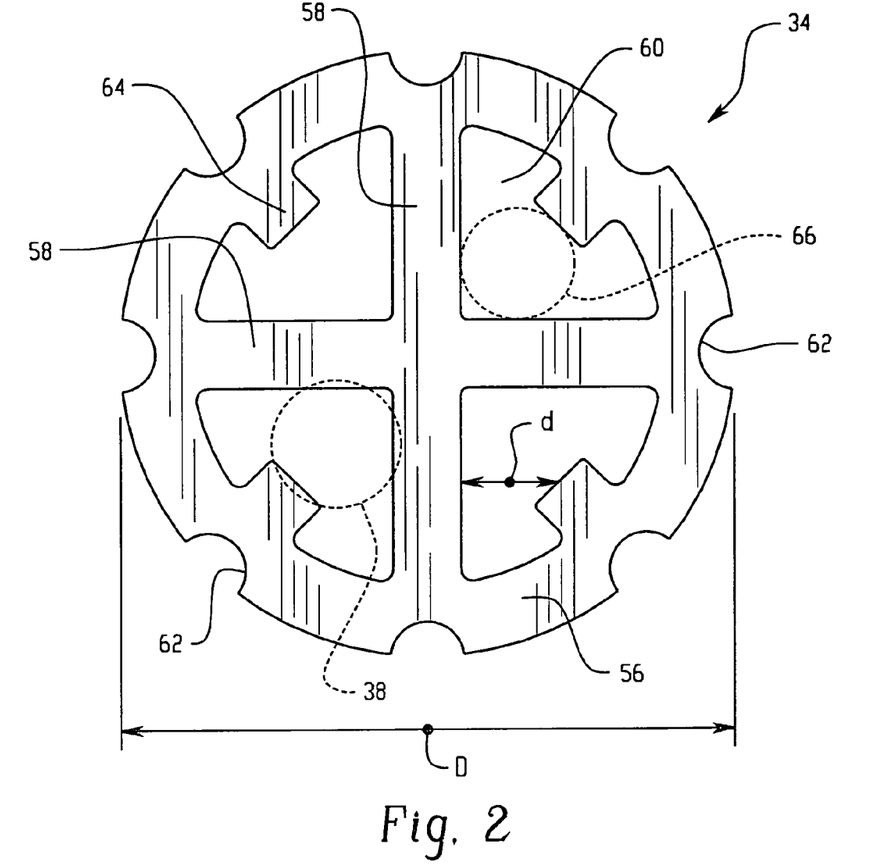
FIG. 2 is a top plan view of a support element according to a first embodiment of the present invention.
Figure 3:
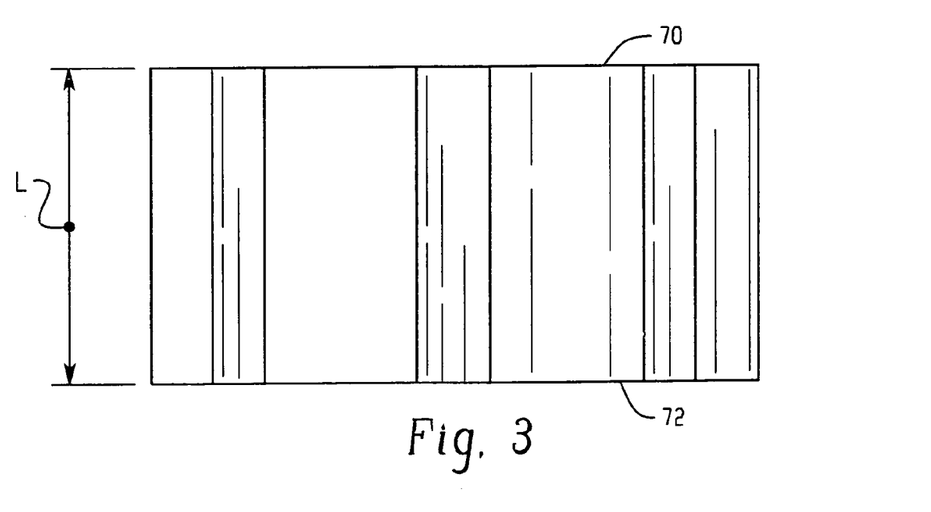
FIG. 3 is a side elevational view of the support element of FIG. 2.
Figure 4:
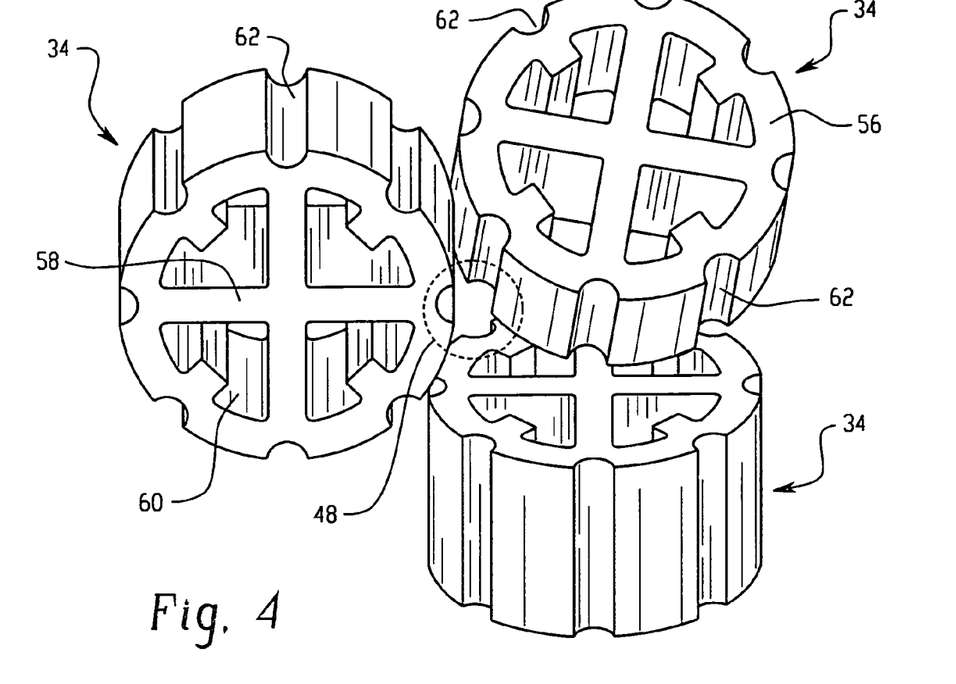
FIG. 4 is a perspective view of randomly dumped support elements.

FIGS. 2 and 3 illustrate an example embodiment of a support element 34. FIG. 4 demonstrates intra-element void spaces 48 between randomly dumped elements 34. The support element 34 includes a containing structure 56 that is essentially cylindrical in shape and this is understood to include perfect cylinders and shapes in which a round cylindrical shape has been somewhat flattened to create an oval cross-section as well as regular and irregular polygonal shapes with at least four, e.g., five or more sides. The space within the containing structure can have a plurality of cross members 58 which serve as structural members connecting one interior part of the cylindrical containing structure with another. In the illustrated embodiment two intersecting cross members 58 form a cross that provides a rigid support for the element.

The support elements 34 may each include at least one through passage 60. In the illustrated embodiment, a plurality of through passages 60 and/or peripheral indents 62 extend along the length of the element which contribute to the void fraction. In the illustrated embodiment, four pie piece-shaped through passages 60 are formed between the intersecting cross members 58 and the containing structure 56. Eight semicircular indents 62 are arcuately spaced around the periphery of the containing structure and extend along the length of the element. Optionally, protrusions 64 extend inward from the containing structure 56. The protrusions 64 serve to limit the maximum diameter of a catalyst carrier element 38 or smaller support element which can pass through a passage 60 while maintaining an open structure for passage of reactants. In this way, percolation of catalyst elements down through the bed 32 may be reduced.

The through passages may have a mean cross sectional width d of at least 5% of the maximum cross sectional width D of the support element (in the illustrated embodiment, D is its maximum diameter), and in one embodiment, at least 10%. For smaller elements (i.e., those less than 1 cm in diameter D), it may be desirable to have a width d that is greater than 10% of the maximum cross sectional width D of the support element, as the passages may otherwise be too small to provide desired flow. For example, for a 6 mm diameter element, the passages may be desired to be at least 1 mm in mean cross sectional width. The maximum size of the passages is dependent, to some degree, on the size of the particles in the layer above. For example, the passages are preferably shaped such that the particles in the adjacent layer above are too large to readily fit through the passage 60, as illustrated by the particle 38 whose periphery is shown by hatched lines. For example, the diameter of the largest circle 66 which can be enscribed within a passage may be smaller than a maximum diameter of elements in the next layer above. Additionally, the periphery of the element may be shaped such that the particles of the next layer above do not readily pass through the inter-particle voids 48.

The example support element 34 has upper and lower faces 70, 72 and defining a cross section having a maximum diameter D. The element has a length L that is perpendicular to the faces. The faces may be planar, as shown, or convex, concave or irregularly shaped. The cross section of the element is generally uniform along the length L, in the case of an element formed by an extrusion process. In one embodiment a ratio of D:L is from about 5:1 to about 1:4, e.g., about 3:1.

It will be appreciated that alternative inner geometries of the support element may be provided, for example, by forming the element with a larger or smaller number of cross members and/or passages. Additionally, the bed support elements of one layer can be differently configured from elements of another layer. For example, the larger elements in the bed may have relatively wider cross members or a larger number of cross members to provide these elements with greater crush strength to support the weight of the bed. It is also contemplated that elements may be formed without cross members, for example, a simple ring-shaped structure. In yet another embodiment, elements of more than one shape and/or size are mixed in a single layer of the support bed.

In one embodiment, at least 80% of the void fraction of the support bed 32, and in one embodiment, at least 90% of the void fraction of the bed 32 is derived from inter-element void spaces 48 and through passages 60 having a mean width of at least 0.5 mm. In this embodiment, the elements 34 are largely formed of non-porous material such that the majority (e.g., at least 90%, and in one embodiment, at least 98%) of the intra-element void fraction comprises through passages 60. For example, the elements 34 may have an apparent porosity, as measured by ASTM C-373 of less than 14%. In one embodiment, the apparent porosity is less than 7%, in another embodiment, less than 3%, and in another embodiment, less than 1.5%. The elements can have an apparent porosity of less than 0.7%. The low porosity may contribute to the strength of the element. In measuring apparent porosity, the through passages 60 are not taken into account. In general, any porosity of the elements 34 which does exist is provided by fine pores, for example, at least 90% of the pores in the element have a diameter of less than about 50 μm.

The support elements may have sufficient crush strength to support the weight of a column they are to be used with thereon. In one embodiment, the elements that make up the lowermost layer 46 have a crush strength of at least 200 lb/sq. in. (14 Kg/cm$^2$), and in one embodiment, at least 300 lb/sq. in (21 Kg/cm$^2$). The crush strength can be up to about 400 lb/sq. in. (28 Kg/cm$^2$), or higher. In one specific embodiment, the crush strength is about 360 lb/sq. in (255 Kg/cm$^2$). In one embodiment, the crush strength of the support elements is greater than that of the catalyst elements.

With reference to FIGS. 5-10, alternative embodiments of a support element are shown. These elements can be similar in dimensions and can be similarly formed to the support element 34, except as otherwise noted. The ratio of D:L, in each case, can be from about 5:1 to about 1:4, e.g., about 3:1.

Figure 5:
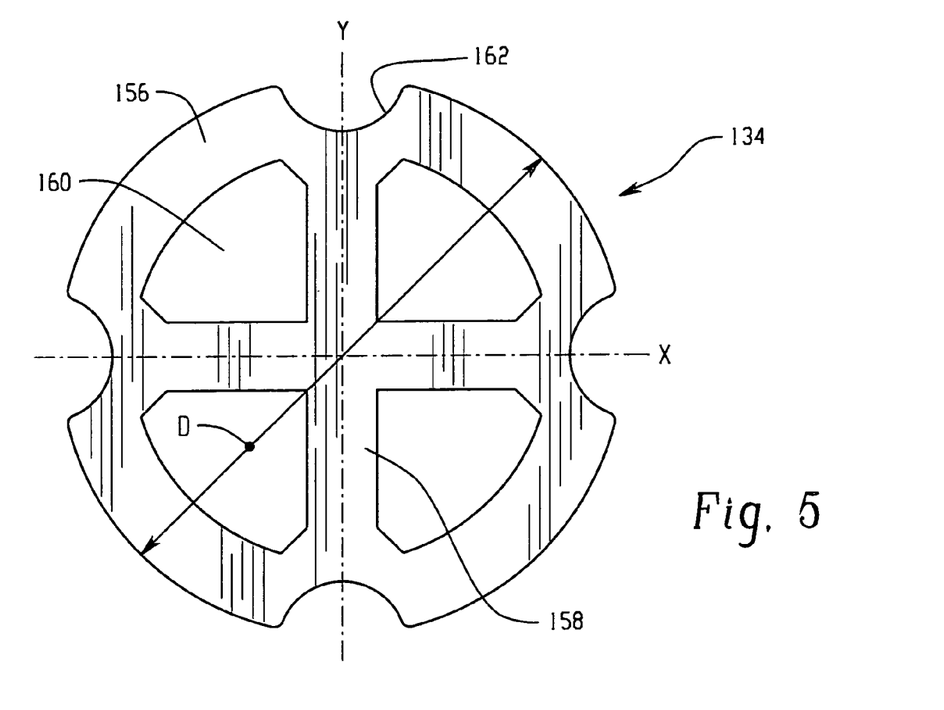
FIG. 5 is a top plan view of a support element according to a second embodiment of the present invention.

The support element 134 shown in FIG. 5 includes a containing structure 156 that is essentially cylindrical in shape and having indents 162. Cross members 158 serve as structural members connecting one interior part of the cylindrical containing structure with another. The support element 134 includes four through passages 160. The element is symmetrical about X and Y axes.

Figure 6:
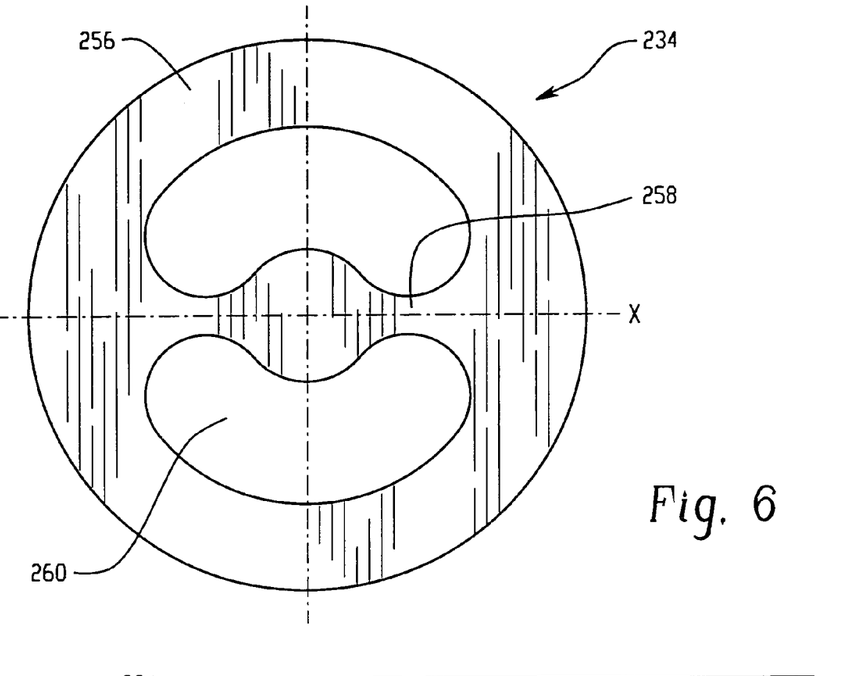
FIG. 6 is a top plan view of a support element according to a third embodiment of the present invention.

The support element 234 shown in FIG. 6 includes a containing structure 256 that is cylindrical in shape without indents. A single cross member 258 connects one interior part of the cylindrical containing structure with another. The support element 234 includes two through passages 260, which are arcuate in shape. The element is symmetrical about X and Y axes.

Figure 7:
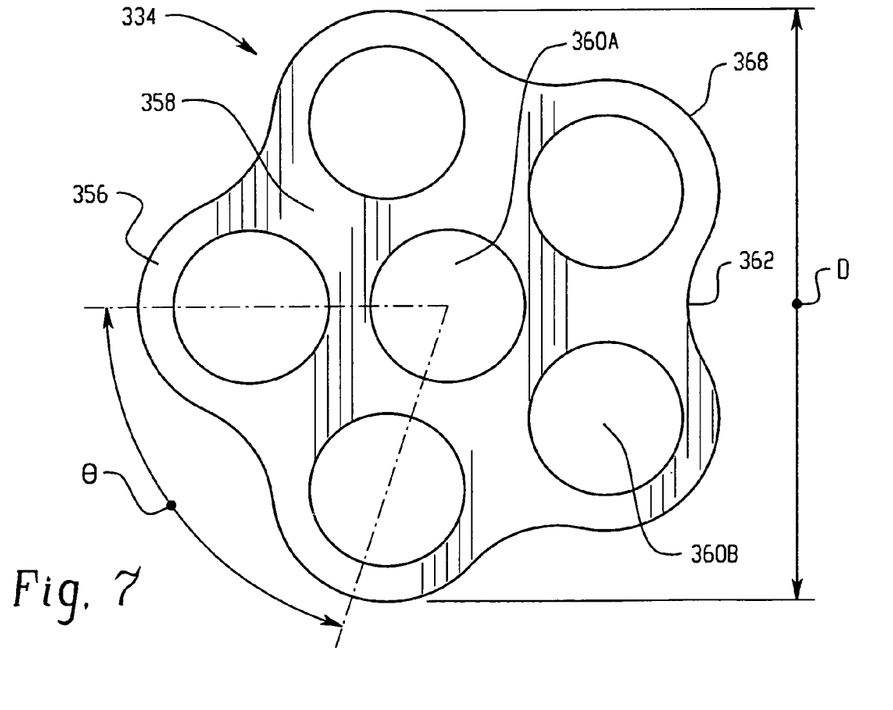
FIG. 7 is a top plan view of a support element according to a fourth embodiment of the present invention.

The support element 334 shown in FIG. 7 includes a containing structure 356 that is essentially cylindrical in shape with cross members 358 which serve as structural members connecting one interior part of the cylindrical containing structure with another. The support element 334 includes six through passages 360, a circular central passage 360A and five arcuately spaced circular passages 360B. Arcuately spaced concave peripheral indents 362 extend along the length of the element and are joined by convex portions 368 of the periphery located adjacent the peripheral through passages 360B. The element is radially symmetrical about an angle θ equal to 360/5 (the number of peripheral passages 360B).

Figure 8:
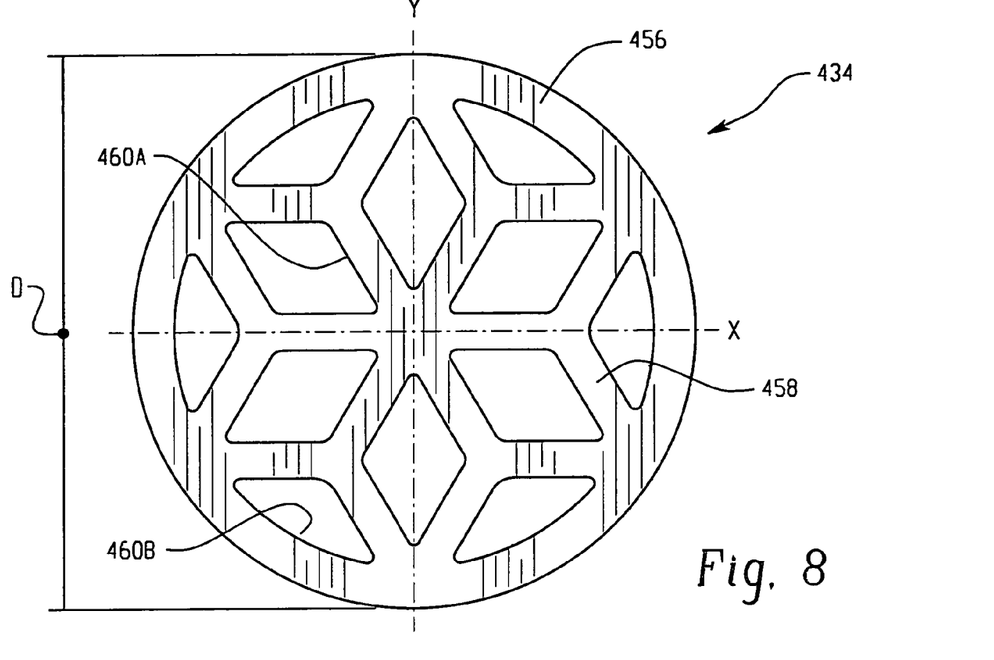
FIG. 8 is a top plan view of a support element according to a fifth embodiment of the present invention.

The support element 434 shown in FIG. 8 includes a containing structure 456 that is cylindrical in shape without indents. Cross members 458 serve as structural members connecting one interior part of the cylindrical containing structure with another. The support element 434 includes twelve through passages 460, six arcuately spaced interior diamond shaped passages 460A and six arcuately spaced generally triangular passages 460B. The element is symmetrical about X and Y axes.

Figure 9:
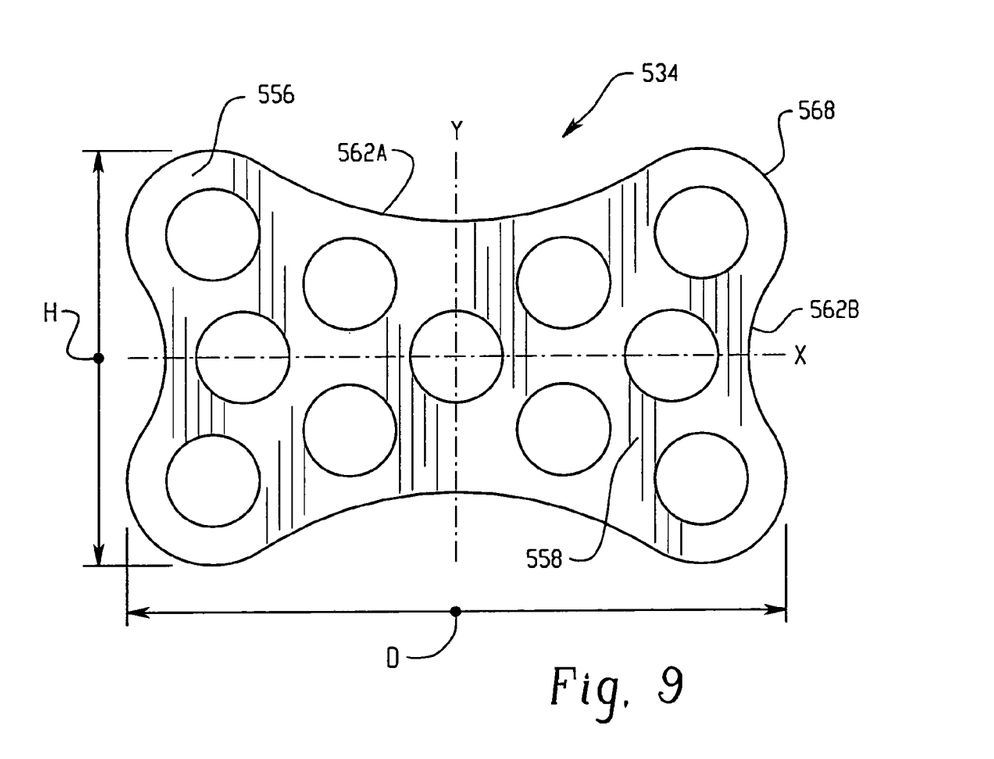
FIG. 9 is a top plan view of a support element according to a sixth embodiment of the present invention.

The support element 534 shown in FIG. 9 is shaped like a dog bone with a maximum width D along the X axis and a maximum height H perpendicular to the X axis. The ratio of D:H may be about 1:1 to 2:1, e.g., from about 1.2:1 to 1.8:1. A plurality (eleven in the illustrated embodiment) of circular shaped through passages 560 are spaced about the element. Pairs of opposed concave peripheral indents 562A and 562B extend along the length of the element which contribute to the void fraction and are spaced from each other or joined by convex portions 568 of the periphery which define the four corners of the element. The concave indents 562A at ends of the height dimension H can define arcs of an imaginary circle of diameter greater than D. The concave indents 562B at ends of the width dimension D can define an arc of an imaginary circle that is about 40-150% of that of the maximum width D. The element is symmetrical about X and Y axes.

The support elements of the invention can be formed from any material that provides sufficient strength for the support element and is compatible with the flowing materials to be used. For example metals, plastics, or ceramic materials such natural or synthetic clays, feldspars, zeolites, cordierites, aluminas, zirconia, silica or mixtures of these may be used. Clays are generically mixed oxides of alumina and silica and include materials such as kaolin, ball clay, fire clay, china clay, and the like. Example clays are high plasticity clays, such as ball clay and fire clay. The clay may have a methylene blue index, ("MBI"), of about 11 to 13 meq/100 gm. The term "feldspars" is used herein to describe silicates of alumina with soda, potash and lime. Other components such as quartz, zircon sand, feldspathic clay, montmorillonite, nepheline syenite, and the like can also be present in minor amounts of the other ceramic-forming components.

Components fired together to produce ceramic bed support elements may be supplied in fine powder form and may be made into a shapeable mixture by the addition of water and/or processing aids, such as bonding agents, extrusion aids, lubricants, and the like to assist in the extrusion process. The mixture can be processed using several different techniques, such as extrusion or pressing using dry pressing techniques to achieve the desired shape. For example, an initial extrusion process may be followed by cutting perpendicular to the direction of extrusion into the desired lengths. An initial drying may be used to drive off water. This may avoid disrupting the relatively weak structure of the greenware and may be carried out at below about 120° C. and, in one embodiment, below about 70° C. and may last for about 5 hours. The bodies may then be processed at high temperatures, for example, a maximum temperature of from 1100° C. to 1400° C., in one embodiment, at least 1200° C., and in another embodiment, about 1250° C., to form a dense body that typically has less than 1.5% apparent porosity, and in one embodiment, less than 0.7% apparent porosity. However, the porosity may be up to about 15% for some applications. The firing temperature may depend, to some degree, on the composition of the elements, and in general, may be sufficient for the bulk of the material to achieve a low porosity. This is in contrast to reticulated ceramic bodies that typically have up to 30-80% apparent porosity or intra-material voids, and which thus may be unsuited to supporting the weight generally found in certain active beds.

For example, the ceramic elements may be fabricated from a mixture of clays and feldspars and other minor ingredients to form a resultant body that is comprised mainly of silicon oxide and aluminum oxide (an aluminosilicate). For example, the mixture used to form the elements may comprise at least about 90% of ceramic forming ingredients and the balance (typically up to about 10%) of processing aids. The ceramic forming ingredients may comprise 20-99% aluminum oxide and 0-80% silicon oxide. The processing aids may be largely volatilized during firing. It will be appreciated, however, that the support elements can be composed of any material that is inert, or in some embodiments, beneficially active, to the component streams in the process environment and provides sufficient crush strength to adequately support a desired column. The components may be thoroughly mixed before water is added in an amount sufficient to enable the mixture to be shaped into the desired form and to retain that form during firing. Generally, the amount of water added may be from 12 to 30 ml for every 100 gm of the dry mixture of the components. The shapeable mixture can then be molded, or extruded to form the desired shape before the shape is fired in a kiln to a maximum temperature of from 1100° C. to 1400° C. The temperature in the kiln may be increased at a rate of between 50 to 90° C./hr. and the dwell time at the calcining temperature may be from 1 to 4 hrs before the kiln is allowed to cool to ambient temperatures.

Where ceramic support elements are produced by an extrusion or a dry-pressing process, they can have an essentially uniform cross-section along one axial direction which provides an axis of symmetry for the element.

Carriers for catalysts are commonly inorganic materials such as refractory inorganic materials, for example alumina-, silica-, or titania-based compounds, or combinations thereof, such as alumina-silica carriers. Carriers may also be made from carbon-based materials such as, for example, charcoal, activated carbon, or fullerenes.

Catalytic elements may be made by depositing a catalytically effective amount of one or more catalytically reactive metals on a carrier to make a catalyst precursor. Typically, the carrier is impregnated with metal or compound(s), complex(es) and/or salt(s) sufficient to coat or impregnate the carrier with a catalytically effective amount of catalytically reactive material. As used herein, "catalytically effective amount" means an amount of catalyst that provides a measurable catalytic effect. The impregnated carrier, or catalyst precursor, may be dried in the presence of an atmosphere which also reduces the catalytic material to the corresponding metal.

Examples of catalytic elements are described, for example, in U.S. Pat. Nos. 6,656,874; 6,649,662; 5,952,529; 5,914,432; 5,733,842; 5,512,530; and Published Application 2004/0170556, the disclosures of which are incorporated herein by reference in their entireties.

The support elements do not need to possess any catalytic activity in that their function is to support the entire weight of the catalyst bed (and any bed limiter present). In one embodiment, the support elements are free or substantially free of catalytic material. In one embodiment, the catalytic activity of the support bed, measured in terms of the rate of the catalyzed reaction, is less than 20% per unit weight of that of the catalyst bed, in another embodiment, less than 10% per unit weight of that of the catalyst bed, and generally about 1% or less. Where the catalyst bed includes layers of different activity, the activity of the catalyst bed may be considered to be that of the predominant layer (in terms of the weight of catalytic elements) or that of the majority of the elements. For example, if the catalyst bed causes epoxidation of olefins at a rate of 10 moles per minute per kg of catalyst bed, the support bed may catalyze the epoxidation of no more than 1 mole/min./kg of support bed, and generally, less than 0.1 moles /min. For other active beds, the activity of the support bed can be similarly defined in terms of the corresponding activity of the active bed, such as an activity that is less than 20% of the activity of the active bed, per unit weight. For example, if the active bed is provided for sequestering, the support bed may have a sequestering activity of less than 20% of that of the active bed, per unit weight.

In one embodiment, the support bed 32 does not serve as a catalyst for a reaction of the reagent as it does not have a catalytic material, such as those described in U.S. Pat. Nos. 6,656,874; 6,649,662; 5,952,529; 5,914,432; 5,733,842; 5,733,840; 5,512,530; and 2004/0170556 deposited thereon or otherwise incorporated therein. However, it will be appreciated that naturally occurring impurities in the materials used to form the support elements, or the materials themselves, may have some, albeit limited, catalytic activity. Additionally, small amounts of the catalytic material may percolate down through the support bed, over time, giving it some catalytic activity.

In another embodiment, the support bed 32 is used to support an active bed 36 comprising elements which have little or no catalytic activity, such as sequestering media. The elements of the active bed may be formed from zeolites, silica gels, activated carbon, combinations thereof, and the like.

Without intending to limit the scope of the invention, the following example demonstrates the effectiveness of one embodiment of the bed support media in reducing the pressure drop and in supporting a catalyst bed.

EXAMPLES

Example 1

Figure 10:
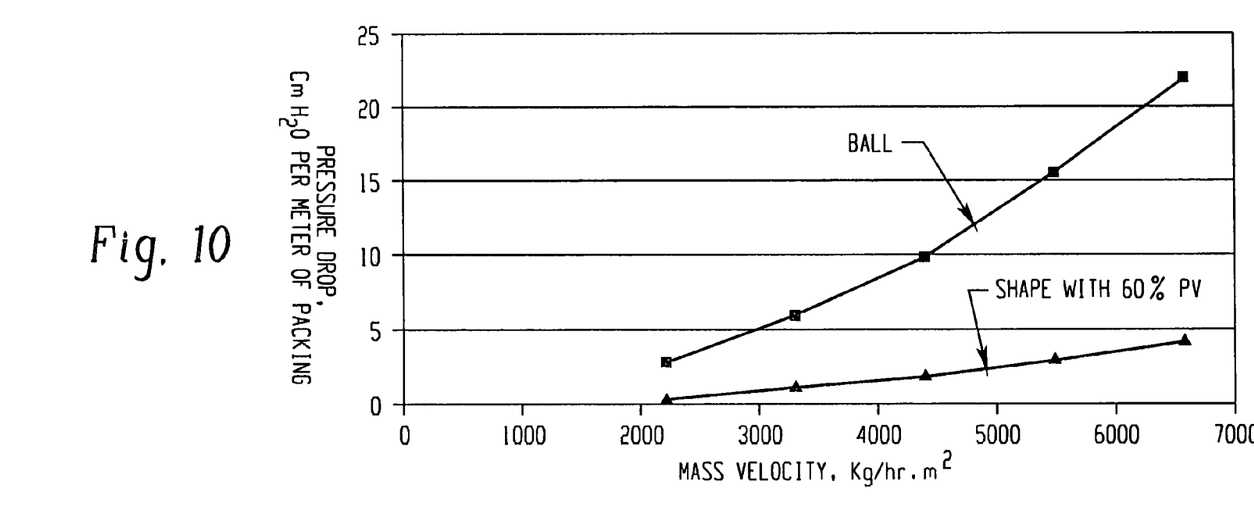
FIG. 10 is a theoretical plot of pressure drop, in centimeters water/meter of bed vs. gas mass velocity in kg/hr·m² for a bed of the support elements of FIG. 2 and a bed of spherical support elements of an equivalent diameter.

Theoretical calculations were made on the pressure drop across a random dumped bed 0.56 m in height of non-porous non-spherical elements constructed according to FIG. 2 with a diameter D of 19 mm, a length L of 10 mm, and a theoretical void fraction of 60%. Calculations were made for a comparison bed of random dumped non-porous spherical elements of diameter 19 mm and a nominal void fraction of 40%, but otherwise identical to the bed of non-spherical elements. FIG. 10 shows the pressure drop, in cm water/meter of bed vs. gas mass velocity in kg/hr·m$^2$ for a bed of the support elements of FIG. 2. It is apparent that the pressure drop across the bed of spherical elements is higher than for a bed of the present non-spherical elements. In all cases, the pressure drop for the spheres is more than double that of the non-spherical elements. For example, at a gas velocity of 27.9 m/min, the pressure drop for the spheres is about 22.5 cm H$_2$O/meter, which is at least about five times that of the non-spherical elements having an equivalent diameter (about 4.1 cm H$_2$O/meter).

Example 2

Figure 11:
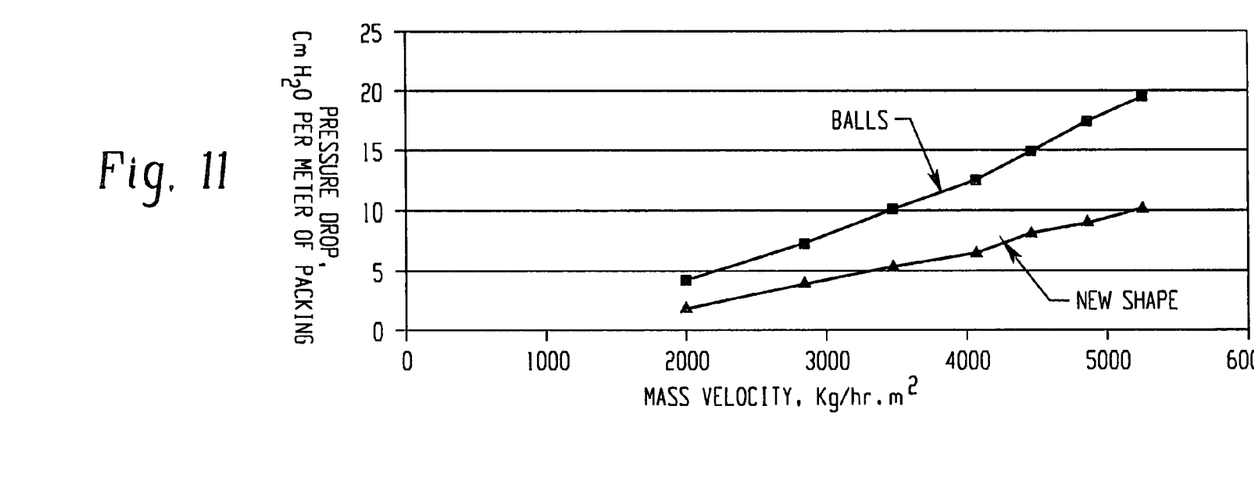
FIG. 11 is a plot of actual pressure drop, in cm water/m of bed vs. gas velocity in kg/hr·m² for a bed of the support elements of FIG. 2 and a bed of spherical support elements of an equivalent diameter.

A mixture of clay, feldspars, and organic extrusion aids comprising about 25% alumina, 68% silica was combined with water. A portion of the mixture was extruded through a die, sectioned into lengths, and fired at a temperature of approximately 1200° C. to form bed support elements in two sizes according to the design of FIG. 2. The elements have an apparent porosity of less than 0.7%. A first set of the fired elements had a diameter D of about 19 mm and a length L of about 25 mm. A second set of the fired elements had a diameter of about 11 mm and a length L of about 7 mm. A portion of the mixture was used to form two sizes of spheres which were fired to a temperature of approximately 1200° C. The fired spheres had diameters of 19 mm and 6 mm, respectively. Beds of approximately 70 cm in height were formed of the spheres and non-spherical elements, respectively, with the smaller elements placed on top and comprising approximately 23% of the bed height in each case. The void fraction of the bed of non-spherical elements was 60%. The void fraction of the spherical elements was 40%. Actual pressure drop measurements in cm water/ m of bed vs. gas mass velocity in kg/hr.m$^2$ are shown in FIG. 11. It is apparent that the pressure drop across the bed of spherical elements was higher than for the equivalent bed of the present non-spherical elements. In all cases, the pressure drop for the spheres was about double that of the non-spherical elements.

Example 3

Catalyst percolation tests are performed on a bed of the non-spherical support elements formed as described for EXAMPLE 2. A column of catalyst pellets on a bed of support elements is assembled. The support media comprises a layer of about 7.6 cm thick of smaller size support media of diameter D=11 mm and length L=7 mm according to the design of FIG. 2 on top of a layer of about 20 cm thick of larger size support media of D=25 mm and length L=11 mm according to the design of FIG. 2. A layer of about 21 cm thick of 3 mm catalyst pellets is supported on top of this bed. The test involves intense vibration of the column at 3.5 KHz for 10 minutes. The results show that no percolation of the catalyst through the support bed occurs.

The example embodiment has been described with reference to the preferred embodiments. Obviously, modifications and alterations will occur to others upon reading and understanding the preceding detailed description. It is intended that the example embodiment be construed as including all such modifications and alterations insofar as they come within the scope of the appended claims or the equivalents thereof.

The invention claimed is:

1. A system for treatment of one or more flowing materials comprising:
   a shell;
   a support bed in the shell comprising a plurality of support elements, the support bed having a void fraction of at least 50%;
   an active bed in the shell supported by the support bed; and
   wherein the support bed has an activity towards the one or more flowing materials which is less than 20% of that of the active bed on a basis of weight.

2. The system of claim 1, wherein the support bed includes:
   a first layer of support elements; and
   a second layer of support elements, supported by the first layer, the support elements in the second layer having a smaller size than the support elements in the first layer.

3. The system of claim 1, wherein the activity comprises a catalytic activity and the one or more flowing materials include one or more reactant materials.

4. The system of claim 1, wherein the support elements have an apparent porosity of less than 3%.

5. The system of claim 1, wherein the support elements have an apparent porosity of less than 0.7%.

6. The system of claim 1, wherein the support elements each comprise a generally cylindrical structure with at least one through passage.

7. The system of claim 6, wherein the at least one through passage has a mean width of at least 1 mm.

8. The system of claim 6, wherein the at least one through passage has a mean width which is at least 10% of a maximum width of the support element.

9. The system of claim 6, wherein the support elements comprise a plurality of internal cross members which define the through passages therebetween.

10. The system of claim 9, wherein a first of the internal cross members intersects a second of the internal cross members.

11. The system of claim 6, wherein there are at least four though passages.

12. The system of claim 6, wherein a largest circle which can be enscribed within the through passage has a diameter of less than a diameter of a plurality of active elements in the active bed.

13. The system of claim 12, wherein the diameter of the largest circle is less than 3 mm.

14. The system of claim 1, wherein the support elements each comprise a cross section which is substantially constant along a length of the element.

15. The system of claim 1, wherein the support elements are randomly oriented in the support bed.

16. The system of claim 1, wherein the void fraction is at least 55%.

17. The system of claim 1, wherein the void fraction is less than 80%.

18. The system of claim 1, wherein the void fraction is less than 75%.

19. The system of claim 1, wherein the active bed comprises a plurality of active elements and wherein the support elements comprise at least a lowermost layer of elements in the shell.

20. A system for treatment of one or more flowing materials comprising:

a support bed comprising a plurality of non-spherical support elements, the support elements each defining at least one through passage, said support bed having a void fraction of at least 45%; and a bed comprising a plurality of active elements supported by the support bed, the support elements having an activity per unit weight towards the flowing materials which is no greater than 20% of the activity per unit weight of a majority of the active elements in the bed of active elements.

21. The system of claim 20, wherein the void fraction is at least 50%.

* * * * *